(12) United States Patent
Smith et al.

(10) Patent No.: US 9,115,823 B1
(45) Date of Patent: Aug. 25, 2015

(54) PROTECTIVE CAP FOR VALVE CAP ASSEMBLY AND VALVE CAP ASSEMBLY

(71) Applicant: VPI Acquisition Corp., Corry, PA (US)

(72) Inventors: Dennis J. Smith, Fort Gratiot, MI (US); Gregory S. Bowes, Union City, PA (US)

(73) Assignee: VPI Acquisition Corp., Corry, PA (US)

( * ) Notice: Subject to any disclaimer, the term of this patent is extended or adjusted under 35 U.S.C. 154(b) by 321 days.

(21) Appl. No.: 13/663,845

(22) Filed: Oct. 30, 2012

Related U.S. Application Data

(60) Provisional application No. 61/553,519, filed on Oct. 31, 2011.

(51) Int. Cl.
*F16L 55/10* (2006.01)
*F16K 43/00* (2006.01)

(52) U.S. Cl.
CPC ...................................... *F16K 43/00* (2013.01)

(58) Field of Classification Search
USPC ........... 138/89, 89.1–89.4; 137/232; 215/306; 220/375, 744
See application file for complete search history.

(56) References Cited

U.S. PATENT DOCUMENTS

| | | | | |
|---|---|---|---|---|
| 4,052,534 A * | 10/1977 | Devitt | ............................. | 429/86 |
| 4,132,225 A * | 1/1979 | Whattam | ...................... | 600/576 |
| 4,640,427 A * | 2/1987 | Marino et al. | ................ | 215/232 |
| 5,657,792 A * | 8/1997 | Prest | ............................... | 138/89 |
| 6,056,015 A * | 5/2000 | Lewis | ............................. | 138/89 |
| 7,954,515 B2 * | 6/2011 | Gerst | ............................. | 138/89 |
| 8,100,149 B2 * | 1/2012 | Keiser | .......................... | 138/89.1 |

* cited by examiner

*Primary Examiner* — Patrick F Brinson
(74) *Attorney, Agent, or Firm* — Roger A. Gilcrest

(57) ABSTRACT

The present invention is to a protective valve cap and a valve cap assembly. The protective valve cap secures and protects a valve and a valve cap during shipping and manufacturing of the assembly of parts comprising the valve and a valve cap assembly. The protective valve cap has a first end comprising a cylinder having a diameter and a length to fit inside and substantially secure the valve cap, a second end comprising an open cylinder having a diameter and a length to fit over and substantially secure an end of a valve that engages the valve cap, and an interferant structure, preferably a solid wall structure, integrally formed with and disposed between the ends and having a diameter larger than the ends.

24 Claims, 10 Drawing Sheets

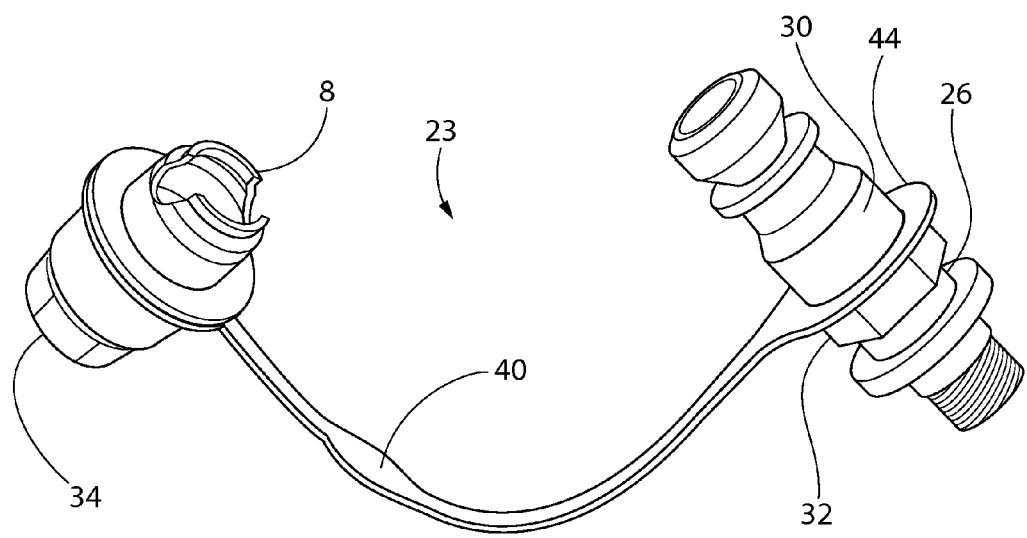
FIG. 5
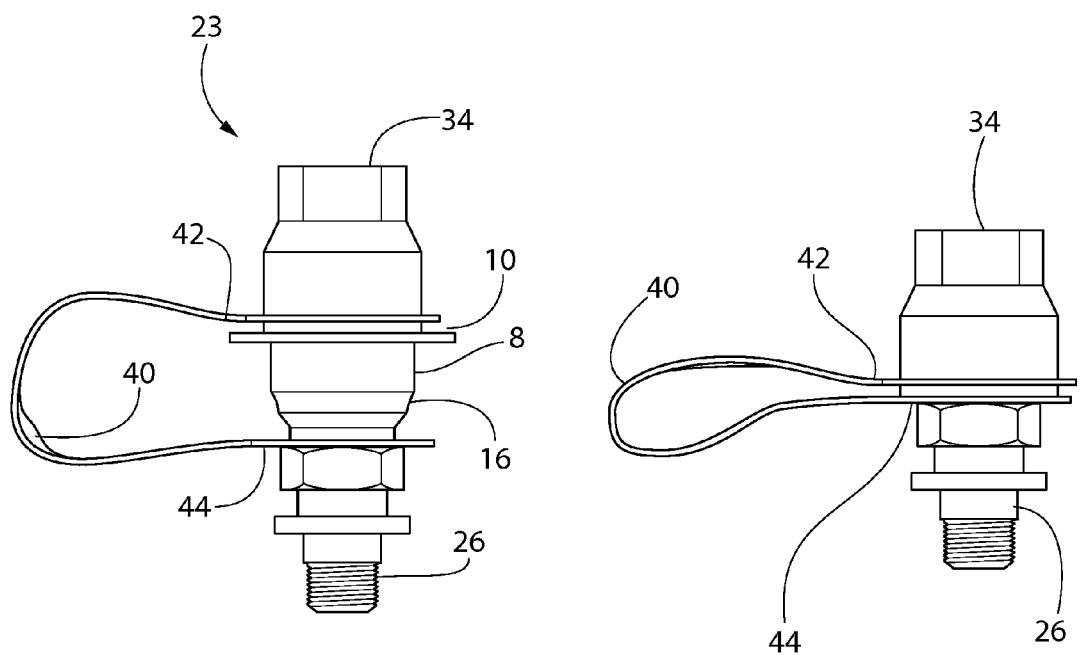
FIG. 6
FIG. 7

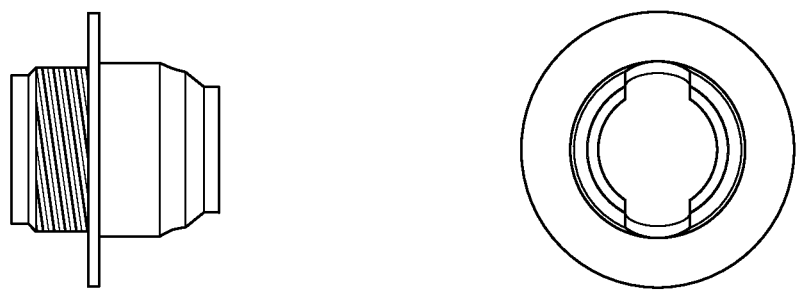
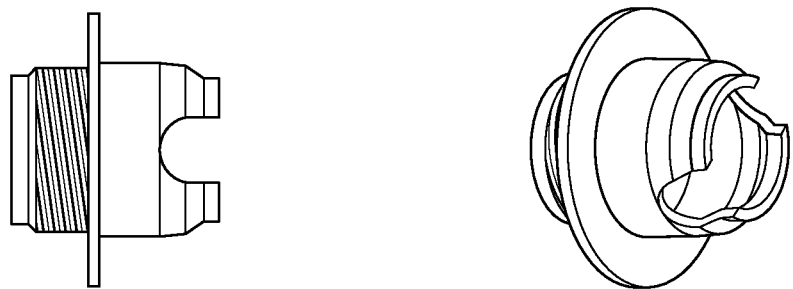
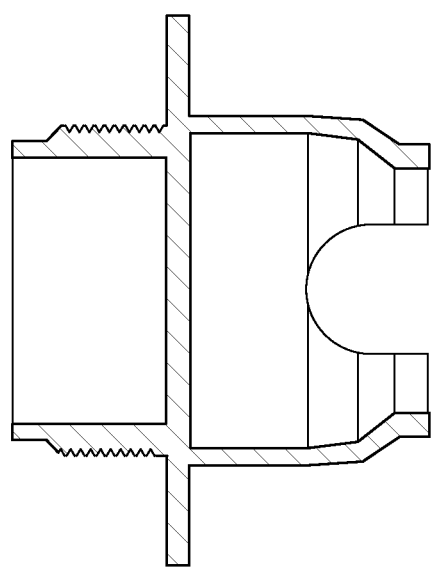
FIG. 15

PROTECTIVE CAP FOR VALVE CAP ASSEMBLY AND VALVE CAP ASSEMBLY

RELATED APPLICATION DATA

This application claims the priority benefit of U.S. Provisional Application Ser. No. 61/553,519, filed Oct. 31, 2011, which is hereby incorporated in its entirety herein by reference.

FIELD OF THE INVENTION

The present invention relates to a valve cap assembly, such as those used in systems and articles for the transmission, dispensing and utilization of compressed gas, especially as applied to original equipment manufacturers of such systems and articles.

BACKGROUND OF THE INVENTION

The following background information is provided to assist the reader to understand embodiments of the invention disclosed below and the environment in which they may be used. The terms used herein are not intended to be limited to any particular narrow interpretation unless clearly stated otherwise in this document.

A valve cap assembly, for example a valve cap assembly used in automobile applications, may be comprised of a valve and a valve cap with seal, and an optional tether that links the valve and valve cap together. The tether prevents the valve cap from being lost or misplaced during installation or maintenance of the valve. Normally, after being attached to the tether, the valve and valve cap are engaged for shipping to manufacturers requiring the assembly. During different stages of manufacturing, the valve and valve cap may have to be disengaged/engaged numerous times, resulting in risk of valve cap loss, damage to the assembly, and the resultant additional assembly time. As such, there remains a need for protecting and maintaining the valve assembly during the shipping and manufacturing and/or assembly process.

SUMMARY OF THE INVENTION

In various embodiments, the present invention relates to an integrated shipping protective valve cap for use with a valve cap assembly. The protective valve cap secures and protects a valve and a valve cap during shipping and manufacturing of the assembly of parts comprising the valve and a valve cap assembly. The protective valve cap has a first end comprising a cylinder having a diameter and a length to fit inside and substantially secure the valve cap, a second end comprising an open cylinder having a diameter and a length to fit over and substantially secure an end of a valve that engages the valve cap, and an interferant structure, preferably a solid wall structure, integrally formed with and disposed between the ends and having a diameter larger than the ends. The interferant structure serves to control the fitment of the protective valve cap as it secures and protects the valve and a valve cap, by controlling the extent to which the valve and a valve cap fit thereover.

The shape and design of the protective valve cap generally is such that it may be used in a valve cap assembly to fit over a valve while being engaged by a valve cap by having the valve cap fit thereover.

In one embodiment, the first end further comprises at least one diminishing diameter wherein the valve cap fits on the first end, the diameter diminishing toward the valve cap, so as to provide a progressively tighter fit as the valve cap is fitted thereupon, and, correspondingly, makes hand-force removal easier during manufacturing, shipping and assembly processes.

In another embodiment, the first end has a threaded portion which engages a threaded portion on the valve cap. This variation may be used in applications where a threaded attachment provides a more secure fitment to resist accidental dislodgement, such as through incidental contact or vibration.

In other embodiments, the cylinder of the second end has a beveled edge connected to an open ring having a diameter smaller than the open cylinder, wherein the beveled edge and the ring fit into a groove on the valve and substantially secure the valve while allowing free rotation of the valve within the protective valve cap. In another embodiment, the second end has at least one cutout or notch. In further embodiments, the protective valve cap may be provided with any other interferant structure that serves to control the fitment of the protective valve cap as it secures and protects the valve, in accordance with the shape and design of the valve.

In other embodiments, a protective valve cap assembly is disclosed. The protective valve cap assembly comprises a valve, a valve cap, a tether, and a protective valve cap. The valve cap may have at least one stop tab and at least one rib for securing the tether while allowing free rotation. In additional embodiments, the valve cap and tether may be color coded or colored to indicate system and fluid. The valve cap and tether may have text indicating at least one of size, instructions for use, maximum torque, system, fluid, and safety or operational warnings. In one embodiment, the valve cap may have a tamper evident tab. The tether has a first end comprising an opening having a diameter and shape to fit over and secure the valve cap while allowing free rotation of the valve cap and a second end comprising an opening having a diameter and shape to fit over and secure the valve while allowing free rotation of the valve.

In other embodiments, a method of using a protective valve cap is disclosed. In one embodiment, after the tether is assembled to the valve cap, the protective valve cap is assembled to the valve cap. The tether is then assembled to the valve, and the protective valve cap is assembled to the valve resulting in a protective valve cap assembly. For installation, the protective valve cap is removed from the valve and valve cap. The valve and valve cap are then engaged for the first time when installed into a system.

Those and other details, objects, and advantages of the present invention will become better understood or apparent from the following description and drawings showing embodiments thereof.

BRIEF DESCRIPTION OF THE DRAWINGS

The accompanying drawings illustrate examples of embodiments of the invention. In such drawings:

FIG. 1E showing a first lateral view, the reverse of which is a mirror image, and FIG. 1F showing a second lateral view, the reverse of which is a mirror image, in accordance with one embodiment of the present invention;

FIG. 5 illustrates an embodiment of a tether assembled to a valve and a valve cap, in accordance with one embodiment of the present invention;

FIG. 6 illustrates an embodiment of a protective valve cap assembly, in accordance with one embodiment of the present invention;

FIG. 7 illustrates an embodiment of a valve cap engaged with a valve, in accordance with one embodiment of the present invention;

FIG. 15 is a cross-section view of a protective valve cap and showing one version of dimensions and angles thereof, as there may be other sizes of similar shape and design.

DETAILED DESCRIPTION OF THE PREFERRED EMBODIMENTS

Figure 1A:
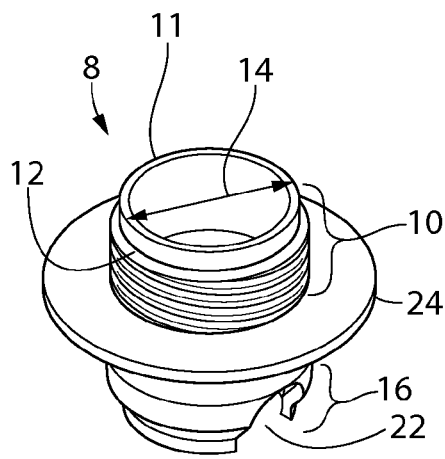
FIGS. 1A-1H illustrate an embodiment of a protective valve cap, with FIG. 1A showing an upper perspective view, FIG. 1B showing a lower perspective view, FIG. 1C showing a top plan view, FIG. 1D showing a bottom plan view.
Figure 1B:
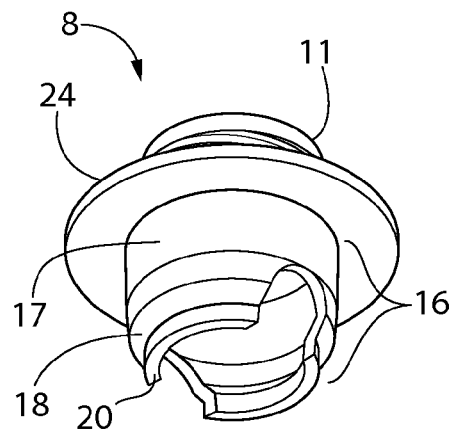
Figure 1C:
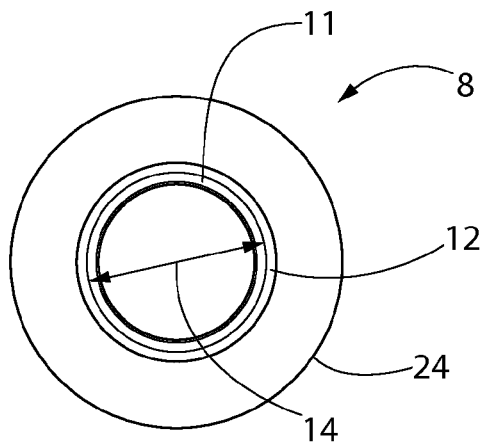
Figure 1D:
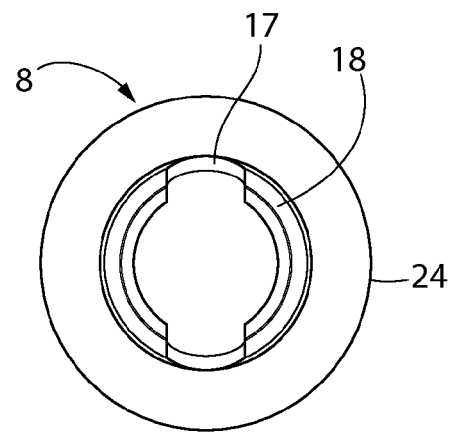
Figure 1E:
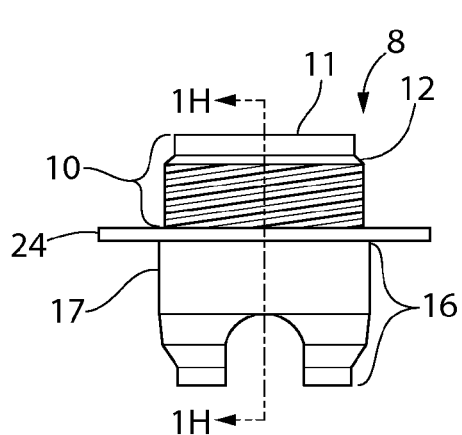
Figure 1F:
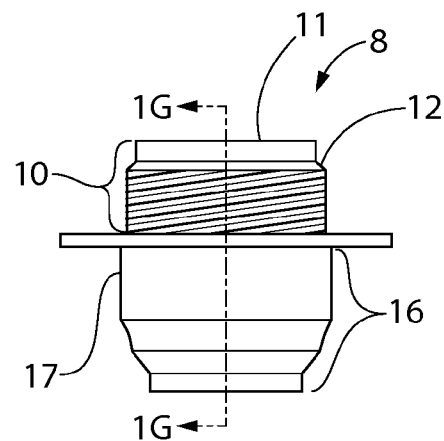
Figure 1G:
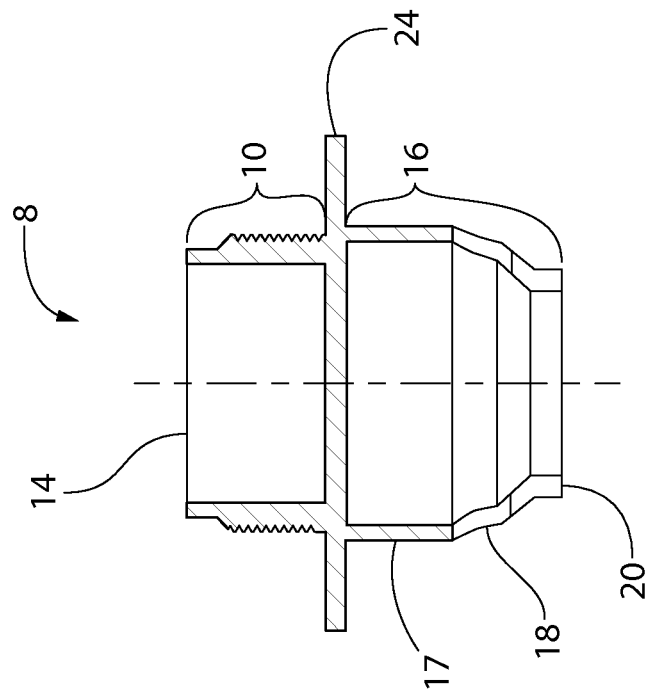
Figure 1H:
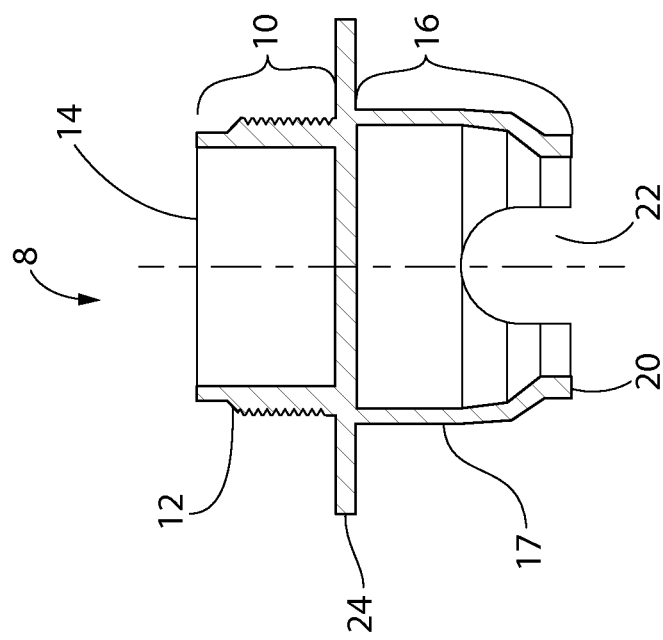

In accordance with the foregoing summary, the following describes the preferred embodiments of the present invention that is considered to be the best mode.

In all of its embodiments and related aspects, the present invention disclosed below may be used with a valve and valve cap assembly, for example a valve cap assembly used in automobile air conditioning systems. The valve and valve cap may be linked by a tether and assembled together during shipping and manufacturing or assembly for prevention of loss or damage. At various times during manufacturing or assembly, the valve and valve cap are disengaged and engaged multiple times, resulting in necessary controlled torque assembly of the valve cap, possible cross threading, and quality issues.

Various embodiments of the present invention relate to a protective valve cap 8 that connects to a valve 26 and a valve cap 34. The protective valve cap 8 allows for protection and ease of manufacturing, thereby reducing manufacturing time and increasing quality. In various embodiments, the protective valve cap 8 is comprised of a thermoplastic material such as, for example, all densities of polyethylene, polypropylene, polybutylene terephthalate, flexible polyvinyl chloride, and is substantially sized for particular valve 26 and valve cap 34 systems. For example, valve sizes R134a, HF01234yf, R744, and R152 in both high side and low side designs and the associated valve caps would each have a protective valve cap 8 substantially fitted for that system, including low side and high side designs.

As shown in FIGS. 1A through 1H, in one embodiment the protective valve cap 8 has a first end 10 comprising a cylinder 11 having a diameter and a length to fit inside and substantially secure the valve cap 34 (as shown in the other Figures). In various embodiments, the first end cylinder 11 may be open (as shown), closed or solid. In one embodiment, the first end cylinder 11 has at least one diminishing outer diameter 14 that creates one or more steps 12. In one embodiment, the first end 10 substantially snaps or fits onto the valve cap 34. In one embodiment, the first end 10 has a threaded portion (not shown) that engages a threaded portion (not shown) of the valve cap 34. Other methods of interferant attachments may be used to attach the valve cap to the protective cap, such as through the use of other frictional or clamping material arrangements.

The protective valve cap 8 has a second end 16 comprising an open cylinder 17 that has a diameter and a length to fit over and substantially secure an end 29 of the valve 26 (as shown in the other Figures). The end 29 of the valve 26 is adapted to engage the valve cap 34. In one embodiment, the open cylinder 17 of the second end 16 has a beveled or tapered edge 18 connected to an open ring 20 having a smaller diameter than the cylinder 17. The beveled edge 18 and the ring 20 are sized to fit into a groove 28 on the valve 26 and substantially secure the valve 26 to the protective valve cap 8 while allowing free rotation of the valve 26 within the protective valve cap 8. In one embodiment, the second end 16 has at least one cutout or notch 22 allowing the second end 16 flexibility to more easily fit over the end 29 of the valve 26.

The protective valve cap 8 may include a rim 24 integrally formed with and disposed between the two ends 10 and 16. The rim 24 has a diameter greater than the two ends 10 and 16 for ease of handling of the valve cap 8. The rim 24 may be circular in shape or may be formed in any shape that is desired.

Figure 2:
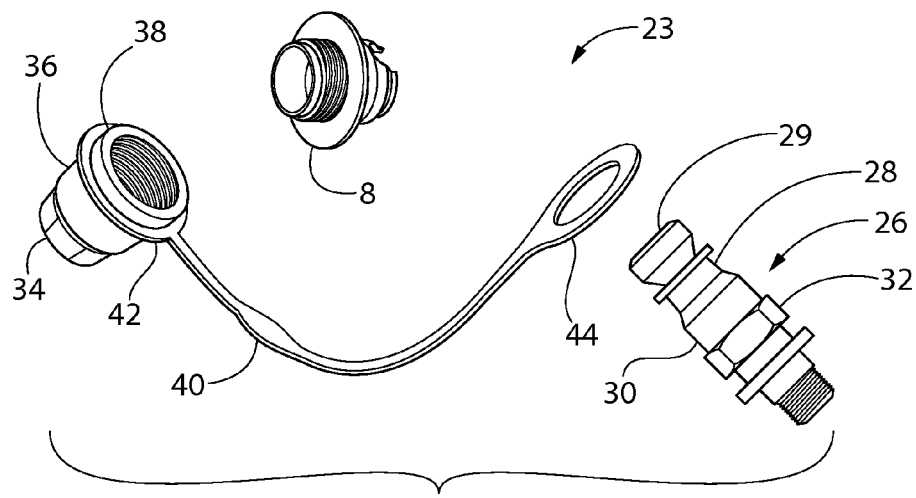
FIG. 2 illustrates an embodiment of a protective valve cap assembly including a valve cap, a valve, a protective valve cap, and a tether in an unassembled state, in accordance with one embodiment of the present invention.
Figure 3:
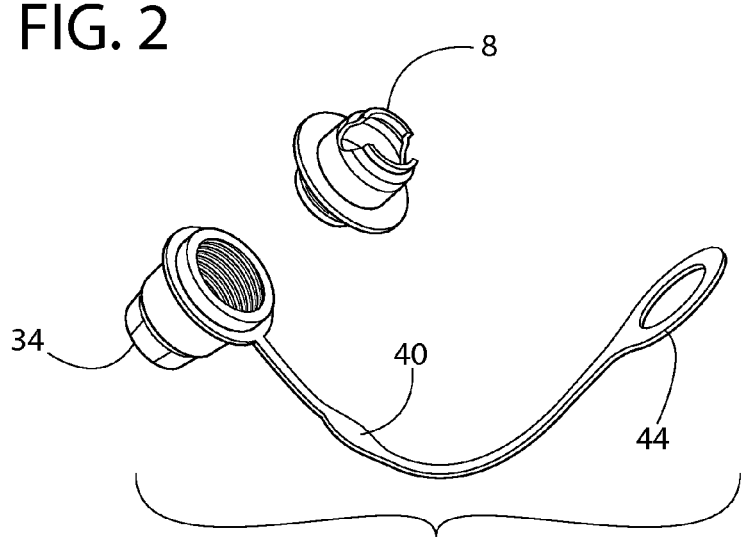
FIG. 3 illustrates an embodiment of a tether assembled to a valve cap, in accordance with one embodiment of the present invention.
Figure 4:
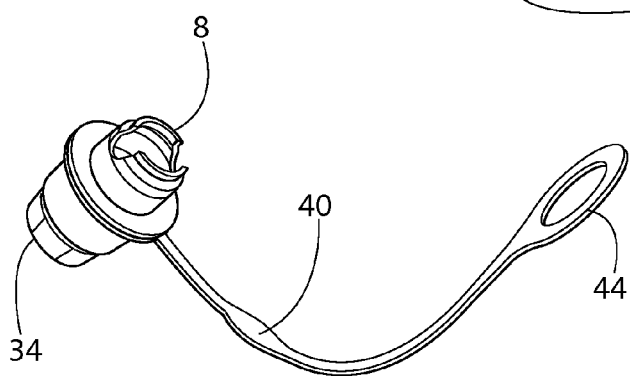
FIG. 4 illustrates an embodiment of a protective valve cap assembled to a valve cap, in accordance with one embodiment of the present invention.
Figure 8:
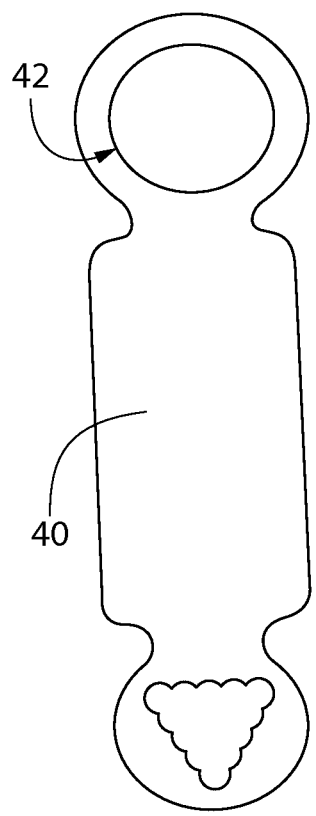
FIG. 8 illustrates embodiments of tethers having text imprinted thereon, in accordance with one embodiment of the present invention.

FIG. 2 illustrates an embodiment of a protective valve cap assembly 23 including the valve cap 34, the valve 26, the protective valve cap 8, and a tether 40 in an unassembled state. The tether 40 has a first end 42 that includes an opening having a diameter and a shape to fit over and substantially secure the valve cap 34 while allowing free rotation of the valve cap 34. See FIG. 3. The protective valve cap 8 engages the valve cap 34, for example by snapping the protective valve cap 8 onto the valve cap 34. See FIG. 4. The tether 40 also has a second end 44 that includes an opening having a diameter and a shape to fit over and substantially secure the valve 26 while allowing free rotation of the valve 26. See FIG. 5. In one embodiment, the second end 44 is in contact with or substantially in contact with an unthreaded portion 30 of the valve 26 abutting a hex head 32 on the valve 26. The tether 40 links the valve 26 and valve cap 34 together. The protective valve cap 8 connects both the valve 26 and the valve cap 34 into the assembly 23 without having to engage the valve 26 and the valve cap 34 until they are ready for installation. FIG. 6 illustrates an embodiment of the valve cap assembly 23. FIG. 7 illustrates an embodiment of the valve cap 34 engaged with the valve 26 as it would be installed. In various embodiments, the tether 40 may be color coded or colored to indicate use with a particular system and fluid, or any other text indicating any information or desired parameter. The tether 40 may have text indicating any information or desired parameter, such as at least one of instructions for use, size, warnings, system, and fluid. See FIG. 8. The tether 40 may be shaped in any shape that is desired. The tether 40 may be comprised of, for example, laminated Mylar (i.e. polyester), laminated vinyl, injection molded polypropylene, injection molded polyester, injection molded LDPE, etc.

Figure 9:
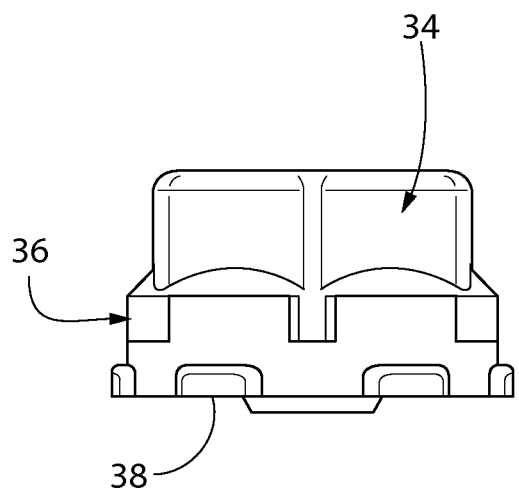
FIG. 9 illustrates an embodiment of a front view of a valve cap, in accordance with one embodiment of the present invention.
Figure 10:
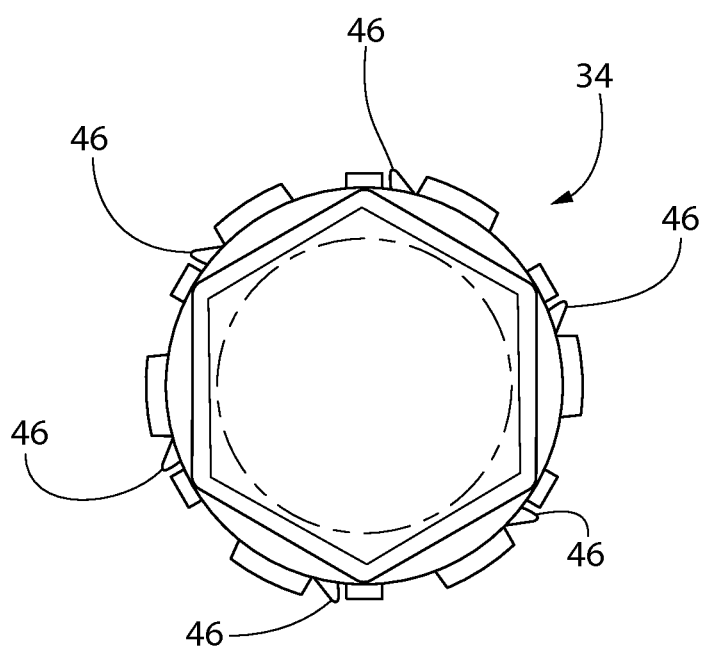
FIG. 10 illustrates an embodiment of a valve cap having text imprinted thereon and a tamper evident tab, in accordance with one embodiment of the present invention.

As shown in FIG. 9, in various embodiments the valve cap 34 includes at least one stop tab 38 and at least one rib 36 for securing the tether 40 while allowing free rotation. In various embodiments, the valve cap 34 may be color coded or colored to indicate any information or desired parameter of the applied system or its use, such as use with a particular system and fluid. The valve cap 34 may have text indicating any information or desired parameter of the applied system or its use, such as at least one of instructions for use, maximum torque, size, safety or operational warnings, system, and fluid. See FIG. 10. In one embodiment, the valve cap 34 has at least one tamper evident tab 46 that hinders unscrewing the valve cap 34 from the valve 26 after installation and provides evidence of such removal.

Figure 11:
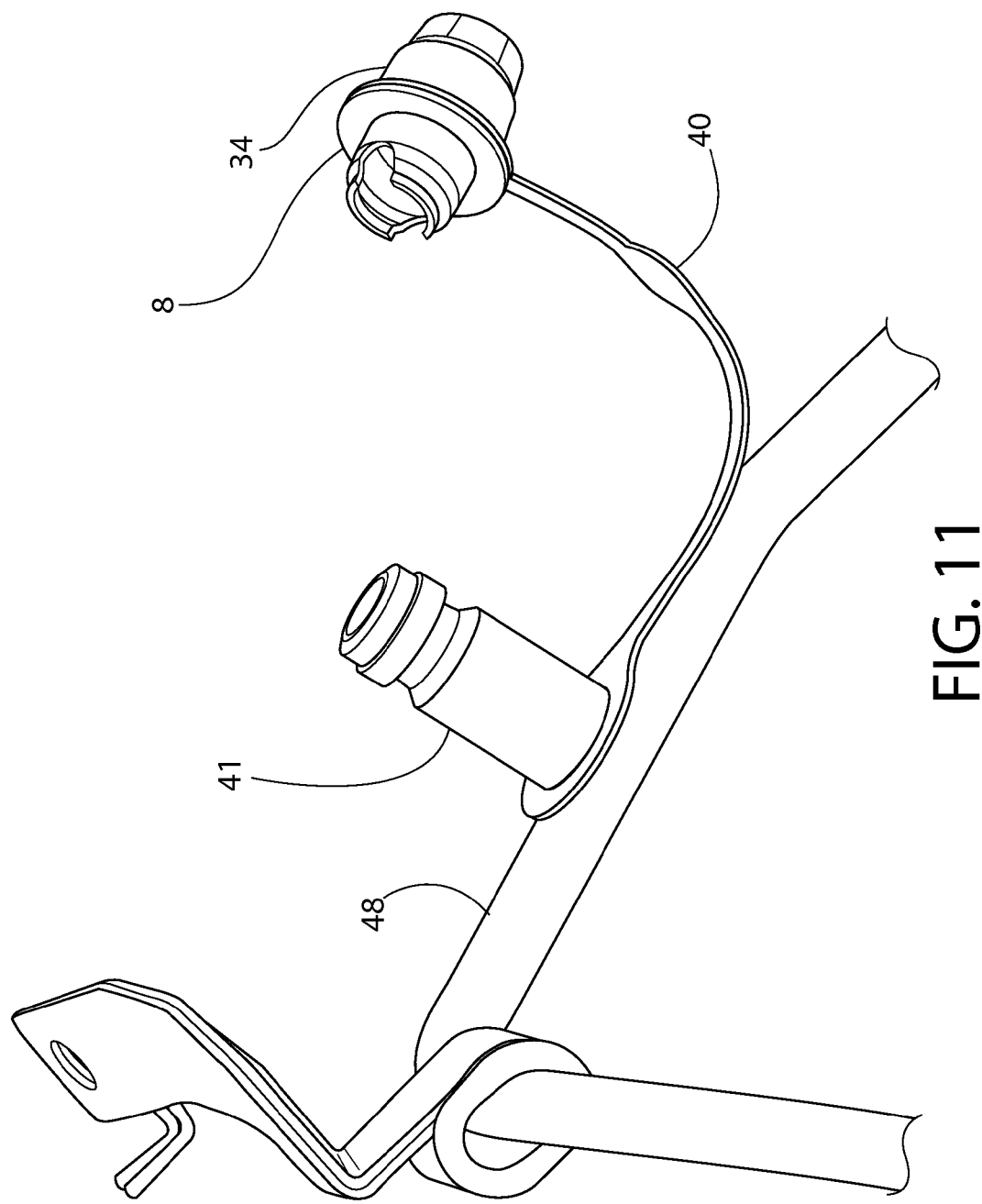
FIG. 11 is a photograph showing a protective valve cap engaging with a valve cap, in accordance with one embodiment of the present invention.

FIG. 11 is a photograph showing a protective valve cap 8 engaging with valve cap 34 having tether 40 affixed to a valve body 41. In this view, the protective valve cap 8 is disengaged from the valve body 41 on fluid conduit 48.

Figure 12:
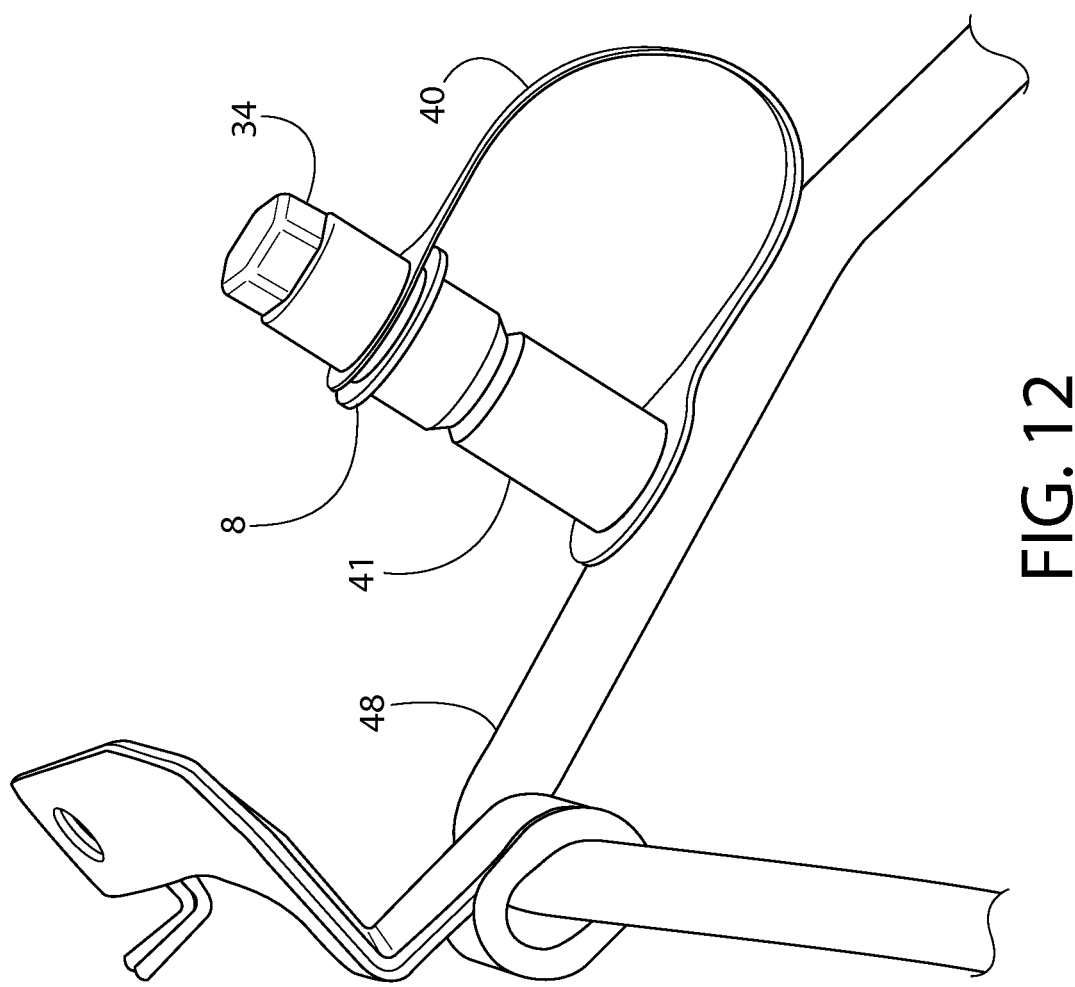
FIG. 12 is a photograph showing a protective valve cap engaging with a valve cap, in accordance with one embodiment of the present invention.

FIG. 12 is a photograph showing a protective valve cap 8 engaging with valve cap 34 having tether 40 affixed to the valve body 41 of valve 26. In this view, the protective valve cap 8 is engaged with the valve body 41 on fluid conduit 48.

FIGS. 11 and 12 show the protective valve cap 8 engaging with valve cap 34 as may occur during manufacture of the assembly including the valve body 41, such as in the manufacture of original equipment automotive air conditioning systems.

Figure 13:
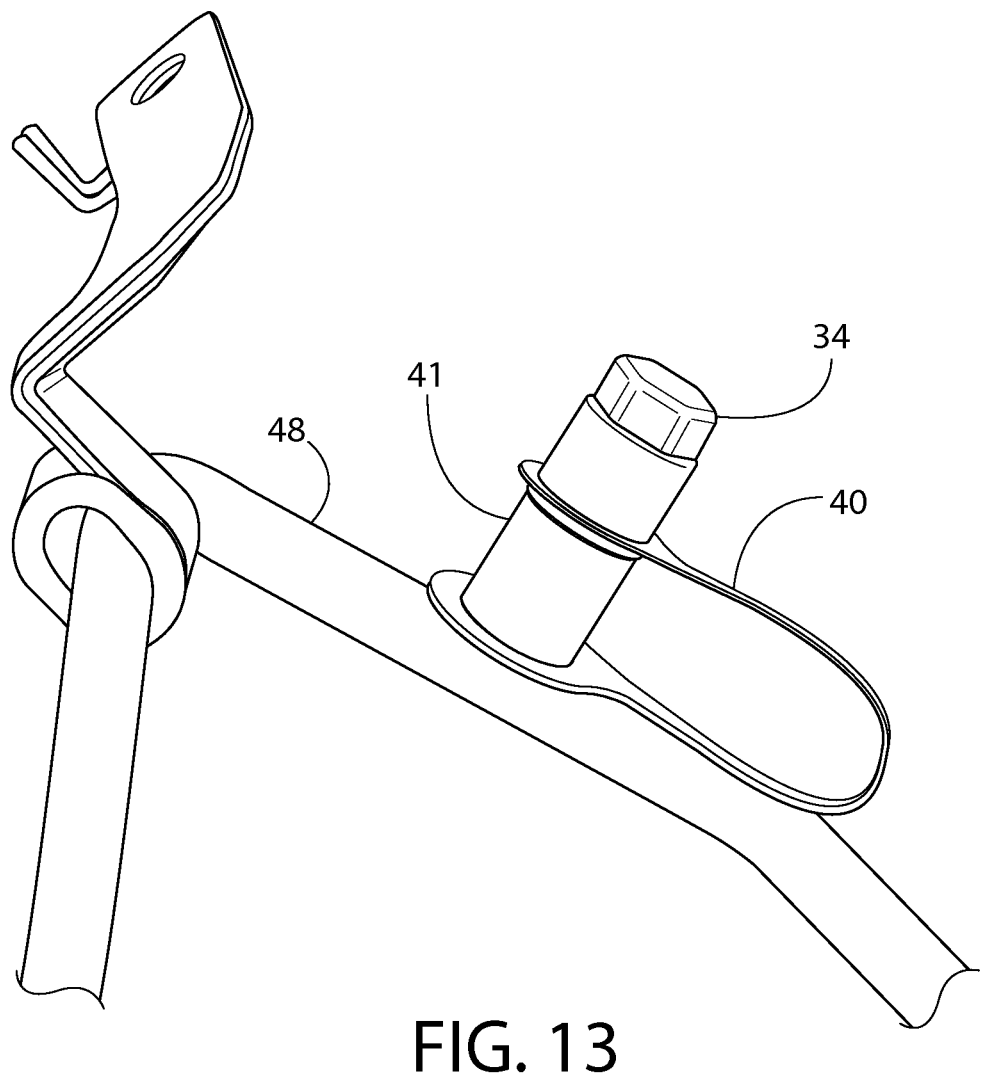
FIG. 13 is a photograph showing the protective valve cap disengaged completely from the valve cap, in accordance with one embodiment of the present invention.

FIG. 13 is a photograph showing the protective valve cap 8 disengaged completely from the valve cap 34 and valve body 41. In this view, the valve cap 34 is engaged with the valve body 41 on fluid conduit 48, as it would appear after final assembly and in use.

Figure 14:
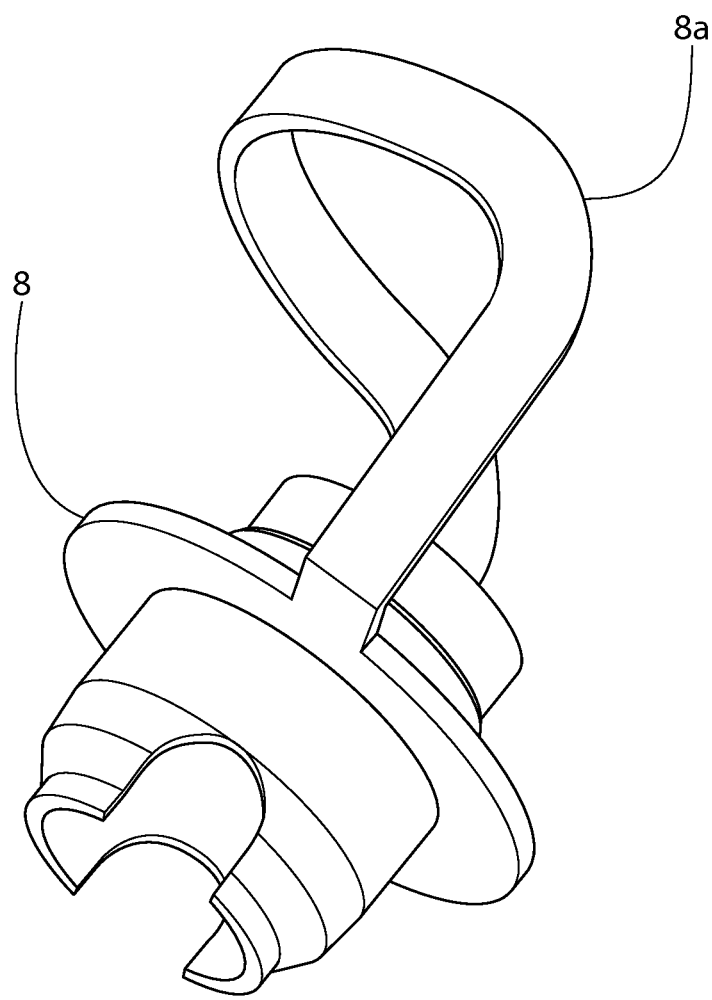
FIG. 14 is a perspective view of a protective valve cap, in accordance with another embodiment of the present invention.

FIG. 14 is a perspective view of a protective valve cap 8 having an integrated pull-off handle 8*a* for ease of handle and use. The pull-off handle 8*a* may be rendered in any manner to allow it to be separated from protective valve cap 8 by hand force, such as through the use of perforation or attenuated plastic material at the interface portions.

FIG. 15 is a cross-section view of a protective valve cap 8 and showing one version of dimensions and angles thereof. The present invention may be made in a variety of sizes of similar shape and functional design, as will be apparent from the desired application.

Embodiments of the present invention also include a method of using the protective valve cap 8. In various embodiments, the steps of the method are: (1) the tether 40 is assembled to the valve cap 34; (2) the protective valve cap 8 is assembled to the valve cap 34; (3) the tether 40 is assembled to the valve 26; (4) the protective valve cap 8 is assembled to the valve 26; (5) the protective valve cap 8 is removed (and optionally replaced) as necessary during manufacturing, assembly or installation; and (6) the protective valve cap 8 is removed and may be discarded and the valve 26 and valve cap 34 are engaged during assembly or installation. Using this method, the valve 26 and the valve cap 34 are only engaged once (i.e., during final assembly or installation), thereby preventing damage and increasing quality of the assembled product.

The protective valve cap 8 disclosed herein provides many benefits. For example, the protective valve cap 8 offers options of hand, wrench, or torx tightening methods during manufacturing, assembly and installation. Controlled torque assembly of the valve cap 8 is eliminated. The protective valve cap assembly 23 saves time by eliminating the need to repeatedly unscrew the valve cap 34 without loss or misplacement. The assembly 23 eliminates part loss by tethering the components together. The protective cap 8 can be easily removed and reapplied through the stages of assembly or manufacturing. Furthermore, cross threading and quality issues related to threaded assembly are substantially reduced. In addition, warning messages, system requirements, etc. can be printed on the valve cap 34 and the tether 40. The tether 40 and the valve cap 34 may be color coded or colored for easier system and fluid identification.

Another benefit of embodiments of the present invention is that the valve cap 34 and its associated seal are virgin until the valve 26 and the valve cap assembly 23 is installed. The problem of the seal sticking to the valve 26 is eliminated by use of the protective valve cap 8. The tamper evident feature on the valve cap 34 of various embodiments hinders unscrewing the valve cap 34 from the valve 26 after installation and provides evidence of tampering. Further, the protective valve cap 8 may be designed in various sizes and shapes, including high side and low side for various valve sizes, are aesthetically acceptable, and comply with industry standards. The protective valve cap 8 may be used in any system requiring valve and valve cap assemblies, including for example automobile air conditioning systems. In some circumstances, valve caps may be eliminated altogether.

The S.A.E. J639 compliant cap assembly offers several potential benefits in a manufacturing or assembly plant setting. These include: the use of a hand-force or wrench tightening design, the elimination of purchased part numbers for the assembly plant, the savings in assembly time by eliminating need to unscrew cap and place it somewhere safe, and the elimination of part loss by having important parts tethered to the valve body. In addition, valve caps no longer fall down into the engine compartment delaying assembly. Warning messages may be printed on the tether to aid assembly.

The present invention eliminates problems with the seal "sticking" to the valve body. By use of the present invention, the cap and seal are virgin until the system is evacuated, filled, and capped, thus reducing wear and contamination or soiling in the permanent system valve cap and valve parts.

The present invention may be provided for both high and low side designs for automotive air conditioning systems. It may be an aesthetically acceptable design for several applications and complies with the latest update of S.A.E. J639 standard. This leads to high customer acceptance.

For T1 Line Suppliers, the benefits may include providing parts or subassemblies received in an assembled form, with simple push-on design for easy assembly. This saves assembly time, and may eliminate the need to screw the cap onto the valve body.

In addition, the assembly of the present invention permits the elimination of controlled torque assembly of the cap, accordingly thereby eliminating the need for special torque tooling and equipment, with the elimination of the attendant cross threading and torque quality issues.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

The present invention has been described with reference to specific details of particular embodiments thereof. It is not intended that such details be regarded as limitations upon the scope of the invention except insofar as and to the extent that they are included in the accompanying claims.

What is claimed is:

1. A protective valve cap comprising:
   (a) a first end comprising a cylinder having a diameter and a length adapted to fit inside and substantially secure a valve cap; and
   (b) a second end comprising an open cylinder having a diameter and a length adapted to fit over and substantially secure an end of a valve, wherein said cylinder of said second end further comprises a tapered edge connected to an open ring having a smaller diameter than said cylinder, wherein said tapered edge and said open ring are adapted to fit into a groove on said valve and substantially secure said valve to said protective valve cap while allowing free rotation of said valve within said protective valve cap.

2. The protective valve cap of claim 1, further comprising a ring integrally formed with and disposed between said first end and said second end and having a diameter larger than said first end and said second end.

3. The protective valve cap of claim 1, wherein said first end has a diminishing diameter.

4. The protective valve cap of claim 3, wherein said diminishing diameter creates a step.

5. The protective valve cap of claim 1, wherein said first end is adapted to substantially snap onto said valve cap.

6. The protective valve cap of claim 1, wherein said first end further comprises a threaded portion, wherein said threaded portion is adapted to engage a threaded portion of said valve cap.

7. The protective valve cap of claim 1, wherein said open cylinder of said second end further comprises at least one cutout section.

8. The protective valve cap of claim 1, wherein said second end comprises a solid wall having a circular shape.

9. A protective valve cap assembly comprising a valve, a valve cap, a tether, and a protective valve cap, wherein said protective valve cap comprises:
   a first end comprising a cylinder having a diameter and a length adapted to fit inside and substantially secure the valve cap; and
   a second end comprising an open cylinder having a diameter and a length adapted to fit over and substantially secure an end of the valve, wherein said cylinder of said second end of said protective valve cap further comprises a beveled edge connected to an open ring having a smaller diameter than said cylinder, wherein said beveled edge and said ring are adapted to fit into a groove on said valve and substantially secure said valve to said protective valve cap but still allow free rotation of said valve within said protective valve cap.

10. The protective valve cap assembly of claim 9, further comprising a ring integrally formed with and disposed between said first end and said second end and having a diameter larger than said first end and said second end.

11. The protective valve cap assembly of claim 9, wherein said first end of said protective valve cap has a diminishing diameter.

12. The protective valve cap of claim 11, wherein said diminishing diameter creates a step.

13. The protective valve cap assembly of claim 9, wherein said first end of said protective valve cap is adapted to substantially snap onto said valve cap.

14. The protective valve cap assembly of claim 9, wherein said first end of protective valve cap further comprises a threaded portion, wherein said threaded portion is adapted to engage a threaded portion of said valve cap.

15. The protective valve cap assembly of claim 9, wherein said cylinder of said second end of said protective valve cap further comprises at least one cutout section.

16. The protective valve cap of claim 9, wherein said second end comprises a solid wall having a circular shape.

17. The protective valve cap assembly of claim 9, wherein said valve cap includes an indicative color.

18. The protective valve cap assembly of claim 9, wherein said valve cap includes indicative text.

19. The protective valve cap assembly of claim 9, wherein said valve cap comprises a tamper resistant tab.

20. The protective valve cap assembly of claim 9, wherein said valve cap comprises at least one stop tab and at least one rib.

21. The protective valve cap assembly of claim 9, wherein said tether includes an indicative color.

22. The protective valve cap assembly of claim 9, wherein said tether includes indicative text.

23. A protective valve cap assembly comprising a valve, a valve cap, a tether, and a protective valve cap, wherein said protective valve cap comprises:
   a first end comprising a cylinder having a diameter and a length adapted to fit inside and substantially secure the valve cap; and
   a second end comprising an open cylinder having a diameter and a length adapted to fit over and substantially secure an end of the valve, wherein said tether comprises a first end and a second end, wherein said first end includes an opening having a diameter and a shape adapted to fit over and secure said valve cap while allowing free rotation, and wherein said second end includes an opening having a diameter and a shape adapted to fit over and secure said valve while allowing free rotation.

24. A method of using a protective valve cap, said method comprising:
   assembling a tether to a valve cap;
   assembling said protective valve cap to said valve cap;
   assembling said tether to a valve;
   assembling said protective valve cap to said valve;
   removing said protective valve cap from said valve and said valve cap;
   and
   engaging said valve and said valve cap for installation.

* * * * *